Sept. 17, 1968  F. R. McDERMOTT  3,401,907
FIBER SURFACE VIBRATION ABSORBING MOUNT
Filed Feb. 12, 1965  2 Sheets-Sheet 1

INVENTOR
F. ROLAND McDERMOTT
BY,
Russell, Chittick, + Pfund
ATTORNEYS

Sept. 17, 1968   F. R. McDERMOTT   3,401,907
FIBER SURFACE VIBRATION ABSORBING MOUNT
Filed Feb. 12, 1965   2 Sheets-Sheet 2
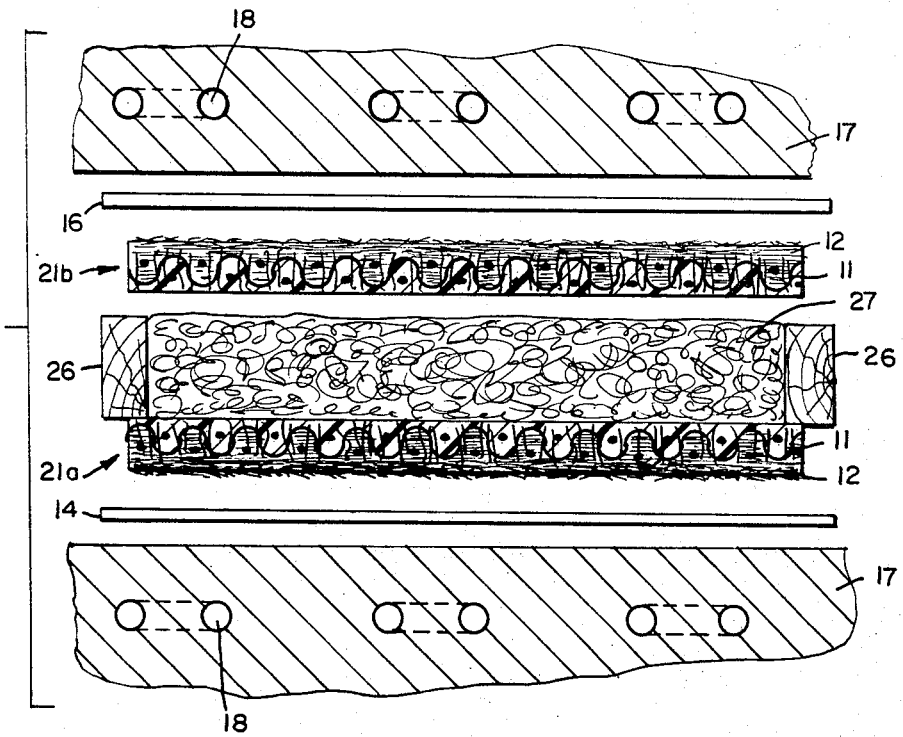
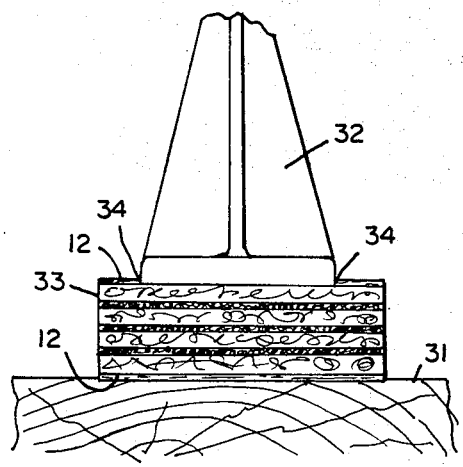
INVENTOR
F. ROLAND MC DERMOTT
BY,
Russell, Chittick, & Pfund
ATTORNEYS United States Patent Office
3,401,907
Patented Sept. 17, 1968

3,401,907
FIBER SURFACE VIBRATION ABSORBING MOUNT
Francis Roland McDermott, Wrentham, Mass., assignor to Clark-Cutler-McDermott Company, Franklin, Mass., a corporation of Massachusetts
Filed Feb. 12, 1965, Ser. No. 432,102
4 Claims. (Cl. 248—22)

This invention relates generally to vibration absorbing pads for use between the load bearing footings on machinery and the floor on which the machine rests. The invention relates more particularly to such pads and their use in mounting particular machines wherein the static and dynamic loading of the pad is such that the weight of the machine or a conventional bolt through type of mounting is not adequate to hold the machine on the pad satisfactorily.

In prior art uses of vibration absorbing pads such as those disclosed in applicant's United States Patent No. 2,809,145, it has been found that many machines, particularly heavy duty machine tools and various forms of production machinery, can be mounted directly upon the vibration absorbing pad with no hold down means other than the weight of the machine itself resting on an appropriate base for supporting the machine which has legs or footings under which the pads are placed. In other installations where the location of the machine must be maintained, particularly against dynamic unbalanced forces and in other particular applications, it has been found desirable to use a hold down bolt through the foot of the machine to the floor with appropriate vibration absorbing pads between all load transmitting interfaces between the structures of the machine and the supporting floor. In each instance the operating conditions are such that a net load in compression on the vibration absorbing pad is maintained and there is no problem associated with the machine footing lifting off the vibration absorbing pad.

In certain installations where the absorption of vibration is a particularly critical problem and particularly with modern light weight machines which are operating at substantially higher speeds than generally encountered with machine tools, the provision of a suitable vibration absorbing mounting for the machine has involved problems which cannot be solved with the gravity loaded or bolt held vibration pad mountings heretofore used. A particular example of machines of this type is the modern high speed, light weight loom which, because of its high speed of operation, has a relatively light weight and low inertia construction but nevertheless introduces large vibration amplitudes which produce dynamic conditions that unload the vibration absorbing pads to the extent of actual lift off of the footing of the machine from the supporting pad and floor.

For conditions such as these and related uses, the present invention provides a vibration absorbing pad which has all the energy absorbing features heretofore available only in pads having gravity loaded surface layers by providing an integrally bonded fiber pile surface layer which is free of any adhesive or polymerized vinyl. This type of pad surface permits an adhesive bond installation and provides both compression loading and tension loading capabilities for a vibration absorbing pad. These capabilities are achieved by using the novel vibration absorbing pad of the present invention in conjunction with an appropriate adhesive which is used to saturate the fiber pile surface layers of the pad and cured in situ with the normal machine load bearing thereon from a footing or other support surface of the machine. With such installation, it has been found that the vibration pad is effective for energy absorption throughout the load cycle and irrespective of whether or not the load is entirely compression or includes tension phases which would ordinarily lift the footing of the machine off a gravity loaded pad. Thus the energy absorption of the pad is continuous and thereby more effective in damping the entire vibration cycle of the machine. In addition, the invention provides benefits resulting from the mechanical stability of the mount to prevent the lift off of the footing of the machine thereby effectively anchoring the machine in its desired location without the necessity of bolts or other mechanical parts which would transmit vibration loads to the supporting floor.

The foregoing advantages and improved vibration absorption features are achieved in accordance with the present invention with pads constructed and used as herein described in conjunction with the accompanying drawings wherein:

FIG. 3 shows a process for producing an alternate form of vibration absorbing pad; and FIG. 4 shows a machine footing mounted to a supporting floor by means of one of the pads of the present invention.

The preferred embodiment of the present invention provides for pile fiber surface layers bonded by continuous phase cured vinyl to a cured vinyl composite vibration absorption pad of the type described in applicant's United States Patent No. 2,809,145 and similar cured vinyl vibration absorbing pads. These include, in addition to the type pad disclosed in the said patent, another class of vibration absorbing pad material which is hereinafter described with reference to FIG. 3.

Figure 1:
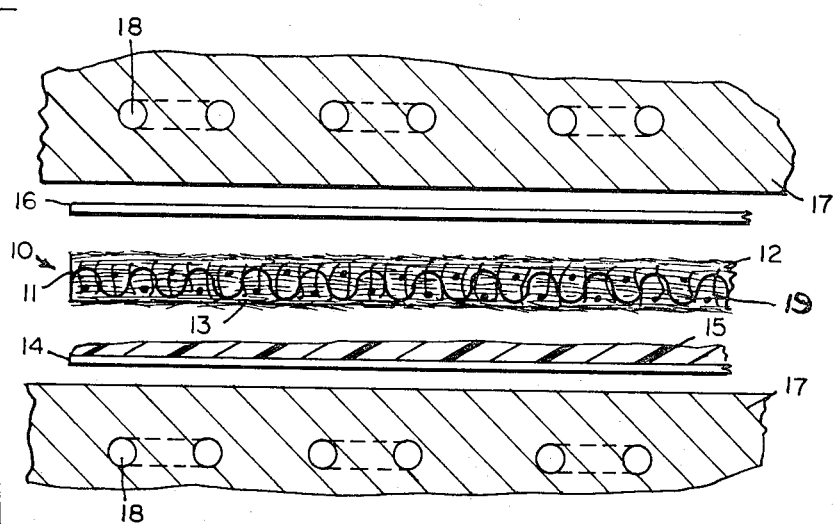
FIG. 1 shows a process for producing a vinyl backed fiber fabric having a pile surface layer free of cured vinyl.

The first stage in the construction of the improved pad in accordance with the invention is illustrated in FIG. 1 which represents the preparation of a cured polyvinyl chloride backed unspun fiber needled fabric having a surface of fiber pile which is free of cured vinyl. As a particular example, a needled fabric 10 is prepared comprising a woven fabric of cloth 11 on which is distributed a uniform layer of approximately fifty grams per square foot of spun or unspun fibers 12 such as rayon. The cloth 11 carrying the layer of fibers 12 is then needled in a conventional needle loom having approximately 7500 needled through strokes per square foot with the result that the under surface of the needled fabric 10 is covered with a substantially uniform layer 13 of needled through fibers from the surface layer 12. The thickness and density of the needled through layer 13 is somewhat less than the remaining fibers in the layer 12 after the needling operation but is sufficient to give a generally uniform layer under the woven cloth 11 and a continuous density of transverse fibers 19 for bonding the fibers 12 to the woven cloth 11 and eventually to the cured vinyl.

In order to impregnate the needled fabric 10 with a cured vinyl backing layer, a flat smooth aluminum sheet 14 has a thin uniform coating 15 of a conventional type of vinyl plastisol placed thereon by any convenient method of spreading and smoothing a thick liquid coating material. The formulation of the vinyl plastisol 15 is a mixture of approximately equal parts plasticizer and finely ground polyvinyl chloride resin thoroughly mixed in a suitable mill and spread on the plate 13 with a uniform coating of approximately twenty-five grams per square foot. In the above example, commercial resin QYNV and di octyl phthalate plasticizer, both of Union Carbide Co., are satisfactory.

To the plate 14 having uniform coating 15 thereon the needled fabric 10 is applied by laying the fabric 10 on the coating 15 with the needled through side 13 fibers in contact with the plastisol vinyl layer 15. A second flat smooth aluminum plate 16 is placed over the top surface of the fabric 10 and rests on the fiber layer 12. The weight of the plate 16 gently compacts the needled fabric 10 and needled through fabrics 13 adhere to the vinyl layer 15. The entire stack is then inserted in a press 17 which is capable of exerting suitable pressure while applying heat to the aluminum plates 14 and 16. For this purpose the platens of the press 17 are supplied live steam through conduits 18 so that the stack can be raised to the curing temperature of the vinyl layer 15. The actual temperature, pressure and curing time for the operation indicated in FIG. 1 will vary with the general consistency and thickness of the vinyl backed layer which is being produced but for the layer hereinabove described a fusing temperature of 350° F. and 30 minutes has been found adequate with the pressure supplied being that produced by a twelve inch ram under 2000 p.s.i. with a plate size for the sheet being manufactured between the aluminum plates 14 and 16 of approximately eighteen by thirty-six inches. The actual temperature and time of the cure will have to be controlled, however, until a satisfactory vinyl back layer is obtained with the vinyl saturating the needled through fibers 13 and penetrating to a minor extent and in a random fashion the woven fabrics 11 but not extending so as to saturate or substantially reduce the fiber layer pile consistency of the layer 12 on top of the woven cloth 11. When cured, this composite vinyl backed fiber cloth can be stripped from the plate 14 and is available for use in the subsequent steps hereinafter described either immediately or after indefinite storage depending upon the manufacturing cycle. The foregoing process includes cooling the stack while maintaining pressure in order to establish the form and structural integrity of the vinyl backed fabric as the fused liquid vinyl composition becomes solid as its temperature is reduced.

Figure 2:
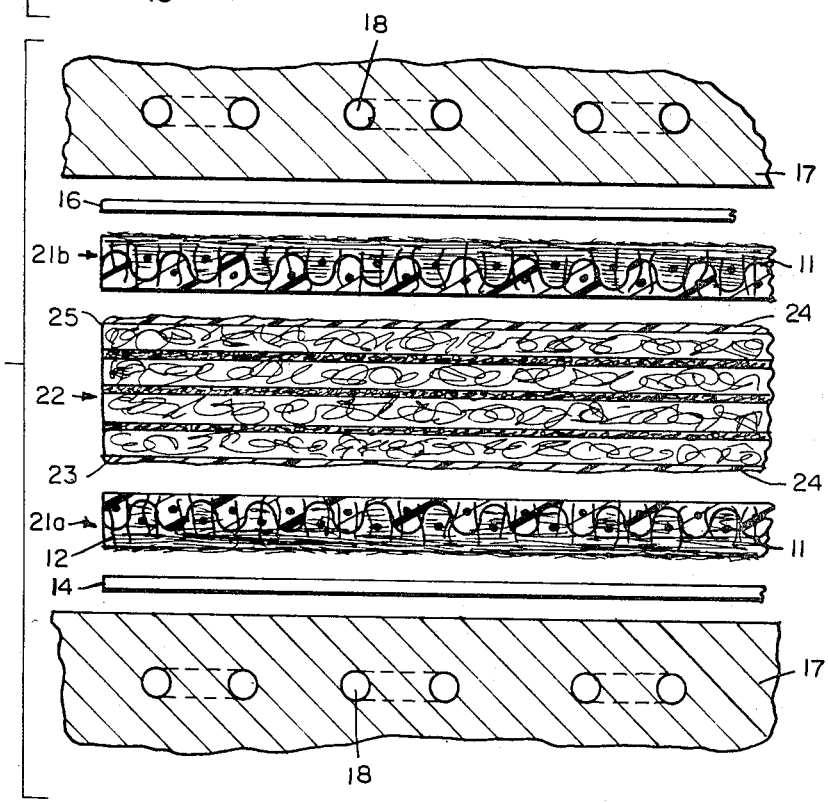
FIG. 2 shows a process for producing a vibration absorbing pad having the vinyl-free fabric surface layers bonded thereto with continuous phase cured vinyl.

FIG. 2 shows the manufacture of a fiber coated vibration absorption pad of the type disclosed in the said Patent No. 2,809,145. The process employs two sheets of cured vinyl backed fiber fabric 21 each of which has been made in accordance with the process described in connection with FIG. 1 herein. A first layer 21a is laid with the vinyl free fiber pile surface 12 down on a flat smooth aluminum sheet 14. A central core member 22 comprising a vibration absorbing laminate such as described in the cited patent but having been made between smooth plates, such as plate 14, instead of plates which produce the diagonal groove pattern of the cited patent, is next laid down with a smooth surface 23 contacting the cured vinyl backing of the layer 21a. Prior to being placed in such contact the smooth surface layer 23 has applied thereto a smooth coating of vinyl plastisol 24. The core 22 has a top surface 25 to which is applied a smooth thin coating of same vinyl plastisol 24 and on this coated top surface 25 a second vinyl backed unspun fabric 21b is laid with the cured vinyl in contact with the vinyl plastisol 24. Next a smooth aluminum plate 16 is applied and the entire stack is placed within the press 17 for curing under pressure with the application of sufficient heat to fuse the layers 24. During this curing process the cured vinyl backing of the layers 21a and 21b softens sufficiently to combine with the liquid plastisol layers 24 which, in turn, combine with the softened vinyl in the surface layers of core 22 without liquefying the entire cured core structure. The heat softened cured vinyl backing of layers 21a and 21b also flows through the cloth 11 to anchor the base of the fibers in layer 12 without saturating the pile surface of the layer 12. Hence the layers become a continuous phase with the portion of the cured vinyl in the surfaces 23 and 25 of the core 22. Since the surfaces 23 and 25 contain fibers of sisal or other such material as described in the cited patent, there is a continuous cured vinyl phase from the core 22 outwardly to and through the woven fabric layer 11 within the cured vinyl backed layers 21a and 21b. This continuous phase cured vinyl is permeated throughout by various fibers in accordance with the construction of the different component layers and after sufficient temperature and time for curing and a subsequent cooling while maintaining pressure on the stack produces a finished vibration absorbing pad of the desired vibration absorbing core structure with an integrally bonded fiber pile surface layer on each surface with the pile surfaces free of cured vinyl or any other material which would alter their uniform mat-like characteristics and their capability for absorbing adhesive in the subsequent use of the pad.

Referring now to FIG. 3, the manufacture of an alternate form of vibration absorbing pad will be described. As before a layer 21a and 21b of the cured vinyl backed needled fabric is employed for the outer surface layer. The layer 21a is placed on a flat aluminum sheet 14 with the unspun fiber side 12 down. A wooden frame composed of peripheral members 26 assembled as a rectangular frame is placed over the cured vinyl surface of the bottom layer 21a and a dough-like mixture 27 is spread uniformly within the confines of the frame formed by the members 26. The dough 27 consists of comminuted cured vinyl and fiber aggregate of the type described in cited patent, No. 2,809,145, after it has been sawed or sliced into finely divided chips of the general consistency of coarse sawdust. To this aggregate may be added additional granular cork and the whole is mixed with equal parts by volume of a plasticizer to form a thick dough-like consistency which can be spread throughout the confines of the frame formed by members 26.

The second layer 21b of cured vinyl backed needled fabric is placed over the wooden frame 26 and rests upon the filling 27 while an upper aluminum plate 16 is placed on the stack and the whole inserted in the press 17 for curing at an elevated temperature and under pressure. The pressure and heat applied are sufficient for curing the vinyl in the dough layer 27 and are also sufficient to soften the cured vinyl backing on the sheets 21a and 21b so that a continuous phase vinyl is achieved from outside the fabric layers 11 through the interior of the pad without cured vinyl appearing in the surface fiber pile layers 12. For example, a pad having a finished thickness of approximately one-half inch has been found to be obtained with heat of 350° F. applied for approximately thirty minutes followed by cooling in the press under pressure to reduce the pad to a temperature in the neighborhood of 100° F. The resulting cured pad has a surface pile 12 on opposite faces thereof of vinyl free fibers securely anchored in cured vinyl continuous phase to the core just as the pad described in connection with FIG. 2. Since the core construction described in FIG. 3 is different than the laminated core of FIG. 2, this pad will have different vibration absorbing characteristics and its application will be in areas where this more homogeneous type core vibration absorbing structure has been found to be useful in the past but with the added feature of the integrally bonded fiber pile surface for adhesively securing the pad to the machine and the floor.

FIG. 4 shows a typical application of the improved vibration absorbing pad of the present invention. In using the pad, the location of the machine on a supporting floor 31 is selected and the machine is supported by any suitable means such as jacks so that its footings 32 are suspended above the surface level 31 of the floor. Finish size pads 33 made in accordance with the invention are then inserted beneath the footings 32 and the floor surface 31 with the fiber surfaces 12 having been previously saturated with a suitable high strength adhesive such as an epoxy resin (Emerson & Cumming Eccobond 45, for example) or natural or synthetic rubber-or-vinyl plastic solvent cements. Other suitable settable adhesives which can be applied in liquid form for saturating the fiber pile layers 12 can also be used. With the fiber pile 12 saturated with adhesive, the pad 33 is inserted between the footing 32 and the floor surface 31 and the machine is lowered onto the pad 33 so that the pad 33 supports the weight of the machine in its final position of use. The machine is allowed to rest with its full weight upon the normal support footings 32 for the particular machine and through the footings 32 onto the pads 33 until the adhesive in the fiber pile 12 has set. The weight of the machine will normally compress the fibers 12 underneath the footing 32 so that an indentation in the set adhesive and fibers at the periphery 34 corresponding to the surface shape of the footing 32 is achieved. This set adhesive impression secures the footing 32 against transverse motion and enhances the tension bond between the footing 32 and the pad 33. It has been found that an ordinary steel footing 32 or similar material makes an adequate bond with the pad 33 by means of this technique so that vibration absorption by the pad occurs with a net tension load even to the point where the pad core itself will be destroyed before the adhesive bond between the footing 32 and the pad 33 is destroyed. Thus the principal objective of the present invention in providing a pad which is capable of vibration absorbing with a duty cycle that can tolerate tension loading in the pad is achieved and the straightforward and simple installation of the pad for this purpose is an advantage both in new equipment installations and those establishments where equipment is periodically rearranged and thus must be periodically installed.

While a particular continuous phase vinyl bond is contemplated for the fiber pile layers 12 on the vibration absorbing pad 33, other means for bonding the fabric 10 can be employed. For example, if a roughened or corrugated surface were provided on the cured vibration absorbing pad, an ordinary adhesive bond of epoxy cement, such as Eccobond #45 made by Emerson & Cumming, or the like used on the needled through fibers 13 of the fabric 10 could be applied to bond the under surface 13 of the fabric 10 to the cured surface of the vibration absorbing pad. Such a pad would be useful within the limits of the adhesive bond so formed and to the extent that such bonds are applicable to a vibration absorption pad are to be considered within the scope of the invention.

While particular embodiments and applications of the present invention have been herein described as the present preferred embodiments thereof, it will be apparent that modifications can be made. For example, different fabric pile surfaces can be used in place of the needled fabric disclosed. Woven fabrics with a felt pile surface are satisfactory although more expensive than the needled fabric. Also a coarse or nubby yarn woven cloth can provide a pile surface adequate for the application and setting of the adhesive when installing the machine. Thus different forms of pile surface cloth can be used without departing from the scope of the invention which is defined by the appended claims.

I claim:
1. A vibration absorbing mount for fixedly securing a machine to a floor comprising a central vibration absorbing core of fibers dispersed in cured vinyl and surface layers of fiber fabric with the fibers of said fabric bonded to the surface of said central core by an adhesive and extending outwardly therefrom, the outer surfaces of said fiber fabric comprising a substantial pile layer of fibers free of said adhesive but firmly bonded to said central core by the adhesive extending from said core to bond with the bases of said pile layers whereby a machine may be fixedly secured to a floor by adhesively bonding one of said surface layers to said machine and the other of said surface layers to said floor.

2. The product of claim 1 in which said surface layers of fiber fabric comprise fibers needled to a woven base fabric and said adhesive is cured vinyl in continuous phase from the fibers in said central core to and including the needled through fibers, said woven fabric of said surface layers, and the base of said pile layer.

3. A vibration absorbing mount securing a machine to a floor, said mount comprising a plurality of footings, a plurality of pads composed of a central vibration absorbing core of continuous phase cured vinyl containing fibers with surface layers on said pads of fabric pile free of cured vinyl and bonded to said core, one of said pads under each of the footings for said machine, and a liquid phase settable adhesive saturating said pile layers and hardened in situ between said footings and the subjacent floor with the weight of said machine supported on said pads under said footings during and after the hardening of said adhesive.

4. The mounting according to claim 3 in which the bond between said surface layers and said central core consists of fibers of said fabric pile extending into said cured vinyl.

References Cited

UNITED STATES PATENTS

| | | | |
|---|---|---|---|
| 2,809,145 | 10/1957 | McDermott | 161—123 |
| 3,245,854 | 4/1966 | Etchison et al. | 161—67 X |
| 3,285,796 | 11/1966 | McElhinney | 161—64 X |

ROBERT F. BURNETT, *Primary Examiner.*

R. L. MAY, *Assistant Examiner.*